United States Patent [19]
Loxham et al.

[11] 3,879,898
[45] Apr. 29, 1975

[54] GEAR GRINDER WITH DIGITAL CONTROL

[75] Inventors: John Loxham, Bletchley; Jack Dinsdale, Cranfield, both of England

[73] Assignee: Cranfield Institute of Technology, Cranfield, England

[22] Filed: Feb. 27, 1973

[21] Appl. No.: 336,354

[30] Foreign Application Priority Data
Mar. 3, 1972  United Kingdom............... 10171/72

[52] U.S. Cl............. 51/33 W; 51/165.71; 51/165.77
[51] Int. Cl........................................... B24b 19/00
[58] Field of Search........ 51/165 R, 165.77, 165.71, 51/165.91, 165.93, 33 W

[56] References Cited
UNITED STATES PATENTS

| | | | |
|---|---|---|---|
| 2,424,271 | 7/1947 | Galloway | 51/33 W |
| 2,932,923 | 4/1960 | Carlsen | 51/33 W |
| 3,699,720 | 10/1972 | Lenning | 51/165.91 |

FOREIGN PATENTS OR APPLICATIONS

| | | | |
|---|---|---|---|
| 1,015,662 | 1/1966 | United Kingdom | 51/33 W |
| 1,169,261 | 11/1969 | United Kingdom | 51/33 W |

*Primary Examiner*—Harold D. Whitehead

[57] ABSTRACT

A machine tool comprises a workpiece support which can be displaced about a first axis; a tool support which can be oscillated about a second axis and which is constructed to support an annular tool for rotation about a third axis spaced from the second axis so that a supported tool will not only rotate about its own axis but will also oscillate on an arcuate path about the second axis; and control means in the form of an electrical masterslave servo system for controlling the relative movement of the workpiece support and the tool support.

19 Claims, 7 Drawing Figures

GEAR GRINDER WITH DIGITAL CONTROL

BACKGROUND OF THE INVENTION

This invention relates to machine tools and is a development of U.S. Pat. No. 3,152,422. The invention is particularly concerned with machine tools for machining or shaping gears, such as spiral and hypoid pinions and crown gears, or slots. In particular, the invention may be applied to machines for rough-cutting and/or finishing such gears or slots with cutting tools and/or grinding wheels.

The invention is particularly applicable to a machine tool for machining a workpiece to provide a curved-tooth bevel gear. Generally, the invention is concerned with a machine tool comprising a workpiece support which can be displaced about a first axis, a tool support which can be oscillated about a second axis and which is constructed to support an annular tool for rotation about a third axis spaced from the second axis so that a supported tool will not only rotate about its own axis but will also oscillate on an arcuate path about the second axis, and control means for controlling the relative movement of the workpiece support and the tool support. Such a machine tool will be referred to herein as a machine tool of the kind set forth.

All known spiral bevel gear manufacturing equipment in current use for cutting or grinding slots or spiral gear teeth, e.g., the Gleason machine, incorporate extensive gear trains to effect control between the oscillations of the workpiece support and the tool support.

For many applications, this has proved to be satisfactory, but nevertheless slight unevenness in workpiece formation does arise because of the use of gear trains, and such unevenness can produce harmful vibration in certain types of equipment employing articles made on such a machine. An object of the invention is, therefore, to provide an improved means of controlling such a machine.

SUMMARY OF THE INVENTION

According to one aspect of the present invention, there is provided a machine tool comprising: a workpiece support which can be displaced about a first axis; a tool support which can be oscillated about a second axis and which is constructed to support an annular tool for rotation about a third axis spaced from the second axis so that a supported tool will not only rotate about its own axis but will also oscillate on an arcuate path about the second axis; and control means in the form of an electrical master-slave servo system for controlling the relative movement of the workpiece support and the tool support.

One embodiment of the invention provides a control system in, or for the conversion of, a machine tool of the kind set forth, the control system comprising: two signal generating means for coupling to respective ones of a workpiece support and a tool support of the machine to produce signals indicative of the angular movements of the respective supports; a comparator for comparing said signals and issuing an error signal when the comparison indicates that said signals do not have a predetermined correspondence; processing means interposed between the comparator and at least one of the generating means to modify the signal of the at least one generating means so that said signals will have said correspondence at said comparator when said supports are moving in a desired relative manner; and means for modifying the data compared by the comparator during the machining of a tooth of a workpiece to provide at least one of tip and root relief of the tooth.

As well as, or instead of, the modifying means, there may be indexing means for indexing the workpiece support, the indexing means comprising means for introducing into the control system when the tool support is stationary a signal equivalent to a predetermined angular movement of the workpiece support to cause the workpiece support to rotate by a predetermined amount.

In this way it is possible after each occurrence of a certain number of sweeps by the tool for a gear or gear blank to be moved so that the subsequent sweep or sweeps of the tool form, or act on, a different and predetermined gear tooth.

The modifying means may be operable to act to vary at least one of the signals supplied to the comparator as a function of the movement of one of said supports of the machine. Thus, the modifying means may comprise means coupled to the processing means to modify the signal supplied by that processing means to the comparator in dependence upon the movement of one of the supports.

One form of modifying means comprises cam means for coupling to the tool support and third signal generating means for producing, in response to rotation of the cam means, a signal for modifying the action of the control system in dependence upon the form of the cam means, e.g. that signal is supplied to the comparator. The modifying means may alternatively or additionally comprise the generating means for coupling to the tool support, that generating means comprising an arcuate portion rotatable with the tool support and scanning means for scanning a region of that portion, the arcuate portion being adjustable so that its centre of radius can be spaced from its axis of rotation to provide tip and/or root relief of a gear tooth profile. That profile, without the offset, would have a true involute form with a straight-sided grinding or cutting tool.

Preferably, the centre of radius is displaceable in one direction such as to produce an amount of relief directly related to the displacement, and is also displaceable in a second direction to vary the ratio of tip and root relief. In one such embodiment, the machine is constructed to allow a displacement in the first direction of an amount which is at least in the range of 4 to 6%, and might, e.g., be up to 20%, of the mean radius of the arcuate portion.

Said arcuate portion may be provided with two accurately divided linear scales for measuring the linear displacements in the two directions whereby the arcuate portion may be initially set to a concentric position and subsequently displaced from that position by precalculated amounts in the two directions.

It will be apparent that the offsetting of the arcuate portion causes a predetermined deviation from true angular synchronisation of the two supports. However, a predetermined deviation can be introduced by equivalent means, as already indicated.

It is also to be noted that the various methods of modifying indicated could be combined in one control system and be operable simultaneously. The tip and/or root relief according to one method could then be designed to progress smoothly from the region of the pitch circle towards the tip and/or root. The relief according to another method could then be added so as to provide a relief more concentrated towards the tip and/or root.

A preferred embodiment of control system combines various of the features set forth above in that it will provide for indexing, smooth tip and root relief and also concentrated tip and root relief. Moreover, a preferred embodiment has as the generating means rotatable patterns and means to scan these patterns whereby passage of the pattern past the scanning means causes variation of the signal generated. Thus, the patterns may be radical optical gratings and the means to scan them include photoelectrical devices and reference gratings for operation on the basis of Moire fringes. The signals concerned will thus be pulse trains and the comparator can then be a reversible counter.

It is also to be noted that one form of the invention is a conversion system in the form of a control system such as it might be made or sold separately for the adaption of an existing machine of the kind set forth having mechanical synchronising means, e.g., a Gleason machine.

DESCRIPTION OF THE DRAWINGS

For a better understanding of the invention and to show how the same may be carried into effect, reference will not be made, by way of example, to the accompanying drawings, in which.

Figure 1:
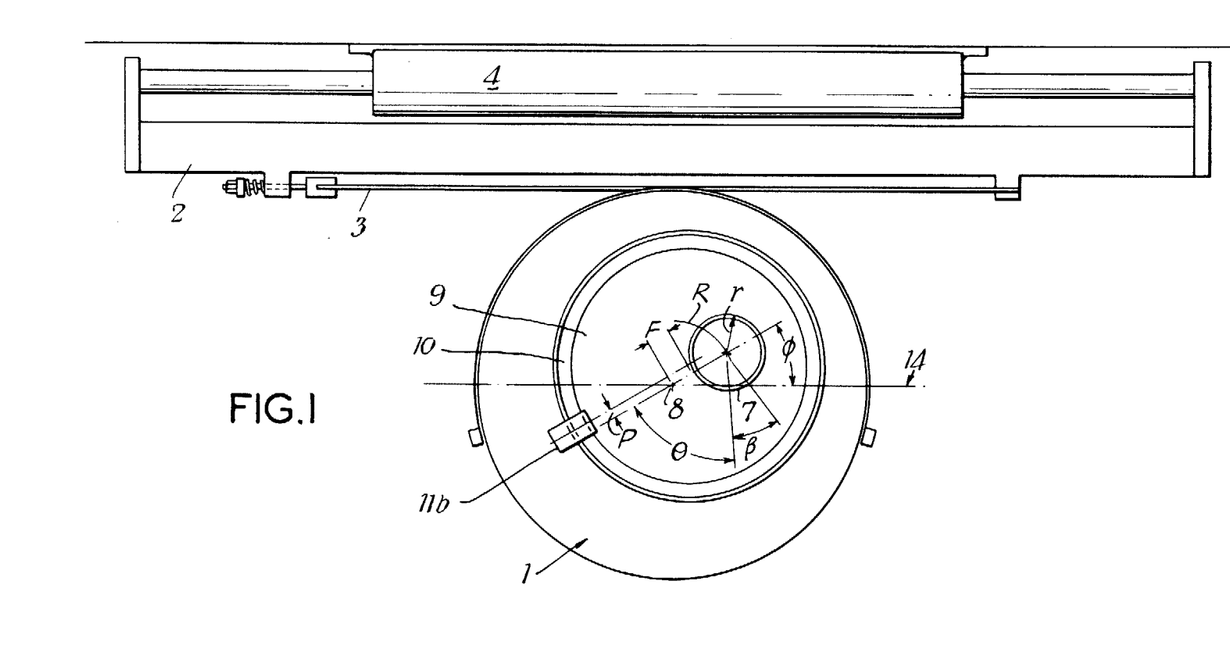
FIG. 1 is a diagrammatic elevational view of a part of a machine tool for grinding spiral bevel gears.
Figure 2:
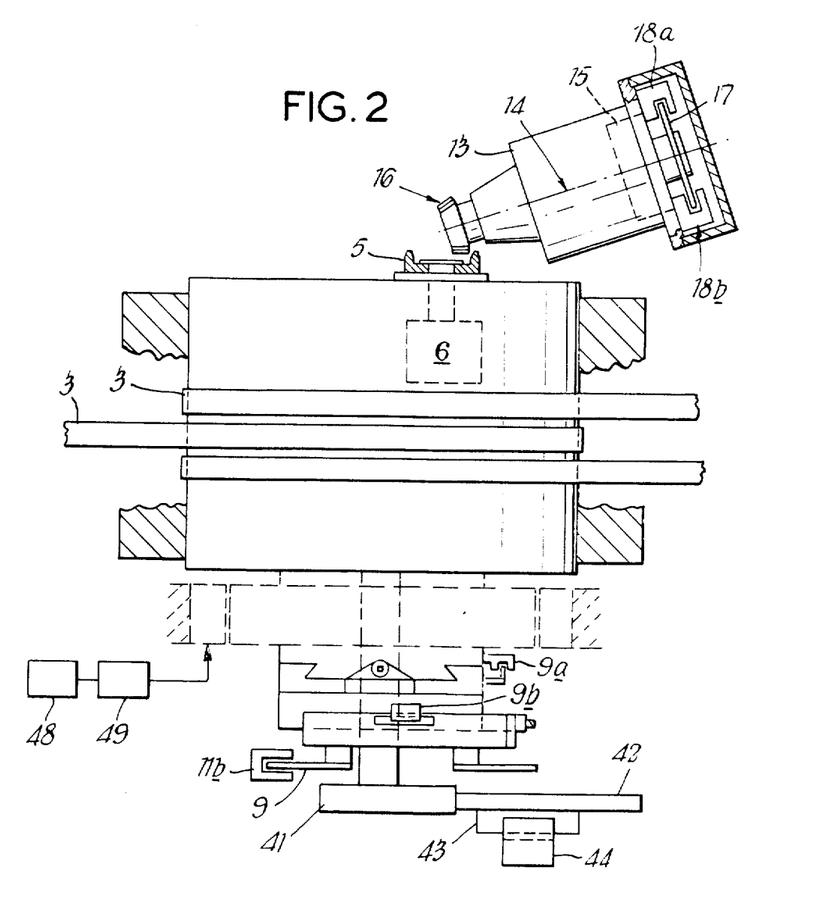
FIG. 2 is a diagrammatic view in plan of the machine tool of FIG. 1 and showing a possible modification.
Figure 3:
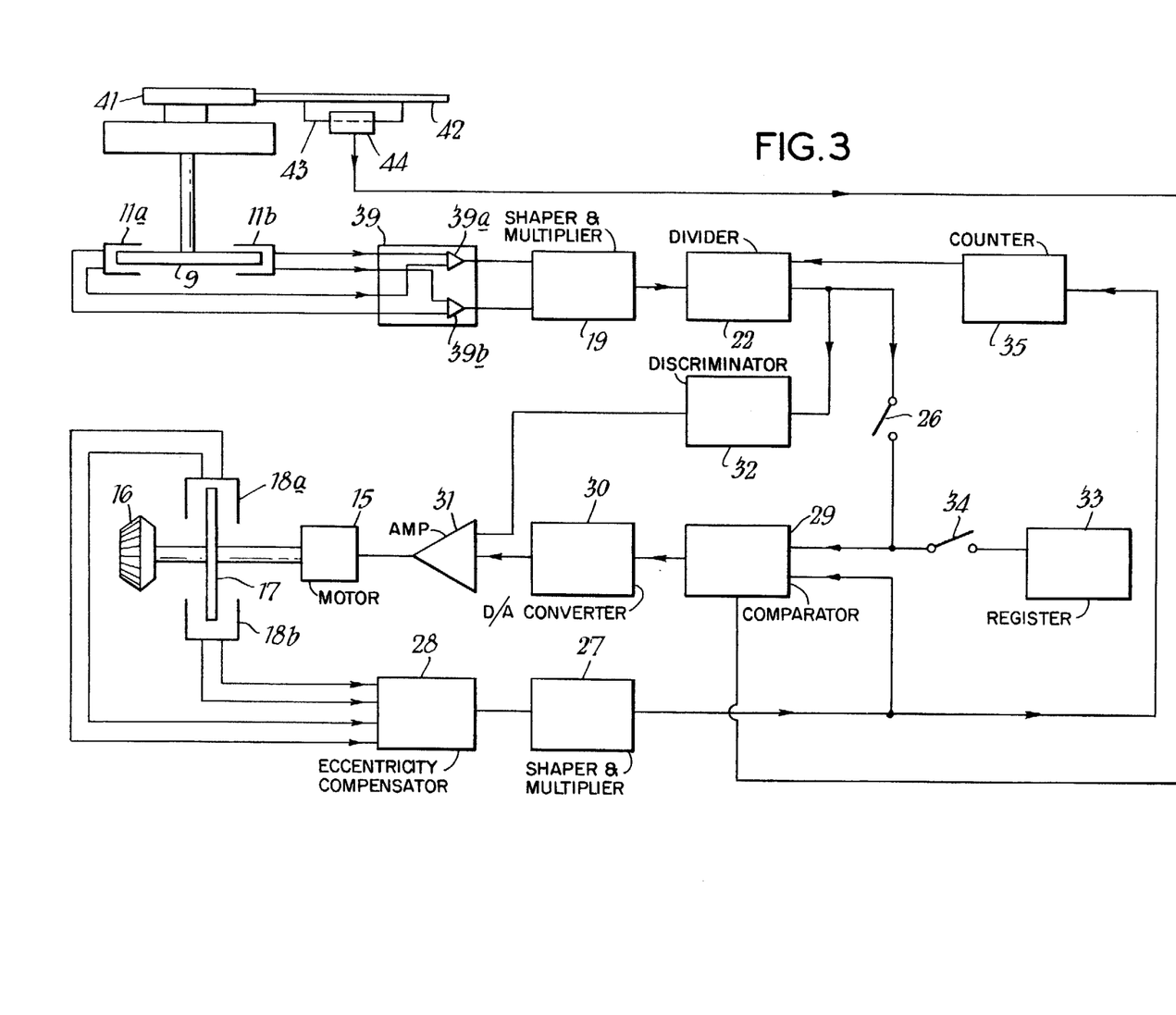
FIG. 3 is a diagram illustrating the control circuit of the machine tool of FIGS. 1 and 2.

A curved-tooth bevel gear grinding machine is diagrammatically illustrated in FIGS. 1 and 2, and its electrical control means are diagrammatically shown in FIG. 3.

The machine comprises a grinding wheel support on a hydrostatic bearing and in the form of a drum 1 which is given a reciprocating angular movement to a predetermined programme. Conventionally, this is achieved by a cam arrangement, but this can be replaced by an electrical control arrangement. Thus, in the case shown in FIG. 1, the reciprocating angular movement is produced by the reciprocating linear motion of a belt carrier 2 coupled to the drum 1 by belts 3. The belt carrier 2 is driven in this example by a double acting hydraulic cylinder 4, which could be replaced by a d.c. torque motor and a preloaded ball-circulating screw and nut arrangement. A programme controlling the drive provides for the setting of a predetermined acceleration and deceleration separated by a predetermined uniform velocity over a predetermined length, the whole cycle of acceleration, constant velocity and deceleration extending over an angular range set so that the section of the grinding wheel operating on the gear face being ground will travel from no engagement through the engagement angle to no engagement again.

In the alternative, the reciprocating motion may be provided by a direct current torque motor mounted directly on the axis of the drum 1, as shown in dotted lines in FIG. 2. This motor is fed from a digital computer 48 by way of a digital-to-analogue converter 47. The computer, which contains the programme for the complete control system, will emit pulses defining the oscillating movement required of the torque motor.

The drum is designed to support releasably an annular grinding wheel 5 at a radius R, the wheel 5 being driven about its own axis at a predetermined speed by a motor 6 supported by the drum. In operation, an arc 7 of the wheel is the effective portion which engages the gear to be ground, the arc 7 subtending an angle $\beta$ at the centre of the wheel and commencing $\theta$ degrees from that point of the wheel nearest the axis 8 of the drum 1. The value of the mean radius $r$ of the wheel and also $\phi$, $\beta$, R and $\theta$ will be preset according to current practice to suit the gear being ground. Also the profile of the active part of the grinding wheel will have a predetermined rack form associated with the pressure angle of the gear to be ground to give, in the idealised case, an involute tooth form.

The drum 1 carried a radial grating provided by a flat glass member 9 bearing uniformly spaced radial lines in an annular zone 10. In this example there are two hundred lines per degree. The member 9 is a circular disc co-operating with two diametrically opposite reading heads 11a and 11b only one of which is shown in FIG. 1. Reading heads 11a and 11b may be used to set the radial lines on member 9 concentrically with axis 8 by deriving from the signals from the reading heads a further signal representing eccentricity. The means for deriving the further signal may be a subtraction means for producing said further signal in dependence upon any difference there may be in values of a parameter (phase position or frequency) of the reading head signals. According to one embodiment described below, a predetermined eccentricity will be subsequently set.

The heads 11a and 11b each incorporates a reference section of radical lines and is designed to produce one Moire fringe per radial line. Each head also has four photocells, one pair to provide a reference (sine) signal and the other pair to provide a quadrature (cosine) signal. A pair is provided in each case, 180° out of phase, to compensate for light variations at the photocells.

According to one embodiment, illustrated in FIG. 1, the member 9 is adjustable by way of orthogonal slides so that the centre of radius 12 of the arcuate zone can be displaced from axis 8 in two directions by variable amounts F and P. Optical linear grating scales 9a and 9b are provided so that predetermined values of F and P can be set. In some cases no provision is made for setting up F and P accurately, as the machine will be operated with F and P at zero all the time. As shown in in FIG. 2, the member 9 and its slides are mounted at that side of the drum opposite the tool, so that the positioning of member 9 in FIG. 1 is purely diagrammatic.

In the arrangement for offsetting the member 9 by amounts P and F, provision is also made for the radial disposition of the reference grating in reading head 11b to be maintained at the same angular position in relation to the main scale in zone 10 to ensure that satisfactory Moire fringes are produced. When the circular zone 10 is set at a predetermined eccentricity, the mean radius of the section of the zone used in the control system is not the same as the radius of the zone when set concentrically. The difference between the effective radius when the zone 10 is set concentrically and eccentrically can be calculated and the divide by N value of the electronic network described below adjusted to suit the value of mean radius for any operating position. When the axis of member 9 is to be offset by values F and P, head 11a may be omitted together with the eccentricity measuring circuit to be described hereinafter.

A gear support 13 (FIG. 2) is provided to support a gear 16 for rotation about an axis 14 upon a hydrostatic bearing and contains a d.c. torque motor 15 to drive the gear 16. The motor also drives a glass disc 17 carrying a further radial grating co-operating with diametrically opposed reading heads 18a and 18b.

The reading heads 11 and 18 are coupled to a synchronising means which controls the operation of motor 15. This control is such that, when required, the angular velocity of the pitch line at the centre of the tooth face is equal to the angular velocity of the arc 7 on the active side of the grinding wheel as it rotates about the axis 8 of the drum. This condition can be satisfied by the methods described in British Pat. No. 1015662.

With reference now to FIG. 3, in the case in which F and P are set always to zero, the signals from reading heads 11a and 11b are summed in a device 39 to form composite sine and cosine signals with the effect of any eccentricity of the member 9 removed (with F and/or P set to a non-zero value device 39 is bypassed). The composite signals are shaped and multiplied by twenty by a pulse shaper and multiplier 19 to provide pulses on one or other of two outputs of shaper and multiplier 19, depending upon the direction of rotation of the member 9 and drum 1. These outputs are represented by a single line 20 in FIG. 3 for the sake of simplicity. These pulses from outputs 20 (of which there are twenty pulses for each Moire fringe) are fed to a pulse divider 22, which divides the pulses by N.

Reading heads 18a and 18b feed a device 28, similar to device 39, which provides signals with the effects of any eccentricity in the mounting of member 17 removed. Device 27 is a further shaper and multiplier which shapes and multiplies by twenty the composite signals from device 28. As with device 19, pulses are produced on one of two lines in dependence upon the direction of rotation of disc 17. This ensures that the system can take directions of rotation into account such that the motor 15 will reverse its direction when the drum 1 reverses its direction.

Thus, the logic circuits 28 and 39 comprise two amplifiers (39a and 39b for circuit 39) for adding, respectively, the sine and the cosine signals from the two associated heads. The outputs from the two amplifiers are supplied to shaper and multiplier 19 or 27 where the signals are processed to provide ten, or twenty shaped pulses for each cycle of the signal. The pulses appear on one or other output of the shaper and multiplier in dependence upon the direction of rotation of the associated grating as determined by a comparison of the sine or cosine signals.

It is to be noted that the effect of the divider 22, reducing the pulse repetition rate, can also be achieved by having pulse multipliers and/or pulse dividers connected to the outputs of devices 19 and/or 27. The divider 22, can be a batch counter with an adjustable batch length (i.e., N is adjustable).

The output of the divider 22 is fed via an electronic switch 26 to a phase comparator 29 where the output pulses of the divider 22 are compared with the output pulses of the device 27. This phase comparator is a reversible counter in this embodiment and is counted in one direction by the pulse train from the divider 22 and in the opposite direction by the pulse train from the device 27, the counting directions also depending upon the directions of rotation of the members 9 and 17.

Any error in the synchronisation of the pulse trains produces an output from the counter, this output being fed to a digital-to-analogue converter 30, to a servo-amplifier 31 and to a control winding of the motor 15 to regulate the motor speed.

The arrangement is designed to operate as a phase-servo, i.e., a position servo superimposed on a constant velocity servo. To compensate for any velocity lag error, the arrangement may incorporate a differential feed forward, in this case in the form of an adjustable gain discriminator 32 connected between the output of the divider 22 and the servo-amplifier 31. The discriminator provides an analogue output proportional to the frequency of its input pulse train.

With no error in the system the counter will oscillate about a set count by a count of one to produce a square wave of high frequency and with unity mark/space ratio. Any error which is then introduced will exist as a change in the mark/space ratio and the gain of the system will be such as to detect this change.

In the arrangement described, a tooth face will be ground on the clockwise and anticlockwise rotation of the drum 1. Which tooth face this is will depend on the angular setting of the gear 16 in the datum position of the arrangement, this datum position being, in this case, the end position in one direction of the angular movement of the drum 1 in which the gear is clear of the grinding wheel. The number of cycles of grinding of one tooth face may be, for example, one, but in any case is predetermined by the control programme, which controls the operation of motor 15, to bring the system to a standstill in the datum position at the end of the predetermined number of cycles. In this position, the drum is held stationary and the gear 16 rotated or indexed under control of the associated optical grating to bring a further tooth into the required datum position for grinding. The necessary angular movement corresponds to a known number of pulses at the outputs of the device 27 and this number is preset in an indexing device 33 connected to counter 29 by an electronic switch 34. The control programme is effective to open switch 26 and close switch 34 in the datum position, so that the known number of pulses for indexing pass from the device 33 (e.g., a register or registers) into counter 29 and thus cause a corresponding rotation of the gear 16. When all the teeth have been ground in this way, the programme automatically stops the machine.

When operated as described, the machine produces a curved-tooth bevel gear with teeth having a true involute form.

In certain circumstances the form of tooth required is barrelled with tip and root relief. The shape of barrelling required is obtained by dressing the rack form on the grinding wheel to the modified arc of curvature considered as optimum for both the convex and the concave sides of the tooth face. A well established and satisfactory method has been developed and is in current use for the above operation.

The amount of tip and root relief required can be obtained, according to one mode of operation, by offsetting the centre 12 about which the radial lines on member 9 rotates by predetermined amounts of F and P. If the amount of tip relief is to be the same as the amount of root relief, distance P will be zero.

Figure 4:
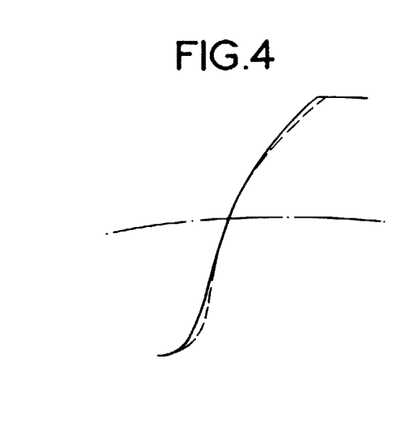
FIGS. 4, 5 and 6 illustrate bevel gear tooth forms achievable with the machine tool of FIGS. 1 to 3.

An example of uniform tip and root relief of equal amounts is shown by a dotted line in FIG. 4. This is achieved with P equal to zero and with F set to a precalculated value corresponding to the amount of relief required. Uniform but unequal tip and root relief is shown in FIG. 5 and is achieved by setting F and P to non-zero values.

In certain cases tip and root relief of equal or unequal amounts are required as concentrated modifications at the tip and/or root with the majority of the tooth profile as a true involute. This form is shown in FIG. 6. The concentrated modifications at tip and/or root may also be required as a modification superimposed on the more uniform modification to tooth profile shown in FIGS. 4 and 5.

Figure 5:
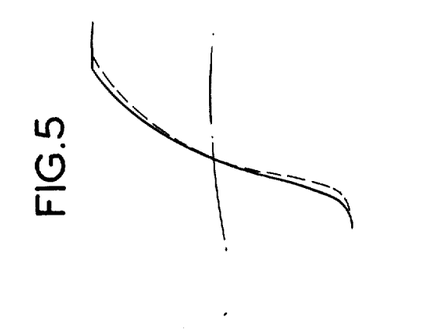
Figure 6:
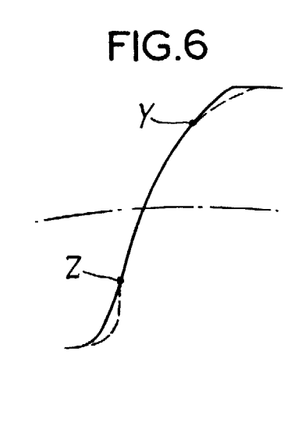

A method for obtaining this more concentrated modification alone or in combination with the relief of FIGS. 4 and 5 is as follows. From the datum starting point for a specific tooth the gear would be allowed to rotate a predetermined amount with no arcuate movement of the grinding wheel about axis 8. The grinding wheel would then be moved as before with the gear under control of the system already described but with the divide number N modified from the calculated ideal for involute form. This would gradually cause the predetermined amount of displacement of the gear from the idealised position to be cancelled and when fully cancelled the divide value N would be returned to the amount for true involute synchronisation. A similar action could be effective at that portion of the grinding stroke where the grinding wheel is operating at the root end of the tooth profile.

In the present example, these operations are achieved by the use of an arrangement 35 including a counter fed with pulses from device 27 to sense the position of the gear to determine when the N value should change.

Let it be assumed that, to generate a true involute form of tooth, the N value is 200. To give tip relief as shown in FIG. 6 the gear 16 is rotated under programme control from its datum position, in a direction opposite to direction of rotation in the grinding phase, with drum 1 stationary. Let the above angle of rotation correspond to 1,000 pulses from the device 27. Switch 34 will be closed and switch 26 open in this mode and device 33 will emit 1,000 pulses to give the required control of this rotation. Switch 26 is then closed and switch 34 is opened. Drum 1 and gear 16 not rotate in predetermined correspondence with N set at 198. This will cause gear 16 to rotate at a faster rate than that required to produce a true involute form of tooth. When the drum 1 and gear 16 have rotated through angles which correspond to 500 pulses at device 27, the increased speed of rotation of gear 16 will have cancelled the preset angular rotation from the datum position described above and the grinding wheel will be operating on the part of the tooth face shown at Y, FIG. 6. This point in the grinding cycle is sensed by the counter of the arrangement 35 which then causes N to be changed automatically from 198 to 200.

A similar but opposite arrangement is introduced when the grinding wheel is operating at position Z (FIG. 6) if root relief is required. That is, the arrangement will sense from device 27 when position Z is reached and will then cause N to change to 202. In certain circumstances, the alterations required to provide a predetermined amount of tip or root relief may not be a convenient fraction of the value N as described above. To take these circumstances into account, arrangements can be made for one pulse to be added to the appropriate section of the system, e.g., to one or other input of the comparator 29 depending upon whether tip or root relief is required, for every predetermined number of pulses given as the output from the device 26, e.g., instead of or in addition to changing N. Instead of adding pulses to one or other section of the system one could respectively add or subtract pulses to or from just one section.

As previously indicated, this action may be combined with uniform relief by the setting of appropriate values of the eccentricities F and P and/or by the means to be described hereinafter.

It is also to be noted that counts equivalent to counts Y and Z could be sensed by coupling the arrangement 35 to reading head 11a or 11b or device 19. Moreover, the initial setting of the gear could be achieved by the indexing device 33 or in response to a count in counter 35 obtained from device 27.

The arrangement 35 is preferably constructed so that the positions Y and Z can be preselected and so that the variations required in N (or the number of pulses to be added or subtracted to give the effect of a change in N) can also be selected. Preselection might be achieved by, for example, decade switches. Thus, utilising comparison means, the output of the counter in arrangement 35 can be compared with adjustable values for Y and Z set manually at the decade switches to detect when the set values corresponding to positions Y and Z are reached by the counter. The comparison means will be effective to indicate or cancel, as appropriate, the adjustment of N, and/or the adding or subtracting of pulses.

It is also to be noted that the reading heads 11a and 11b (and 18a and 18b) may be connected to an eccentricity logic circuit which indicates by means of a digital display a signal proportional to the eccentricity of the grating of member 9. This arrangement will be used in initially setting the coaxial position of the gratings of the member 9.

The eccentricity logic may comprise two multipliers for multiplying the cycles of the sine and cosine signals from the two associated heads. Each multiplier has a first output, bearing the multiplier output signal when the member 9 rotates in a first direction, and a second output bearing the multiplier output signal when the member 9 rotates in the opposite direction. Via sampling means, the first outputs are connected one to the UP input and the other to the DOWN input of a reversible counter and the second outputs are connected one to the DOWN input and the other to the UP input of the counter. The sampling means avoids the loss of pulses when two occur simultaneously at the outputs of the multipliers.

As illustrated in FIGS. 2 and 3, this embodiment has additional means for setting tip and/or root relief in place of, or if desired as well as, the offsetting of member 9. A cam 41 of predetermined profile is mounted on the axis of the drum 1 to rotate with the drum. A push rod 42 engages the cam surface of the cam and carries a linear grating 43 which is thus caused to move in a radial direction in synchronism with changes in the radial dimension of the cam 40. A stationary reading head 44 is caused by the movement to emit pulses with polarity dependent upon the direction of movement of grating 43. The relative amounts of tip and root relief can be adjusted by adjusting the angular position of cam 41 on the drum and the overall amount and form of relief can be changed by changing cams. The output pulses from head 44 are supplied to comparator 29.

The system described so far is either one in a machine tool and made specifically for the system or an existing Gleason machine tool with much of its mechanical control features removed.

An embodiment of the invention can also be provided as a conversion system for a simplified modification retaining the mechanical control of drum oscillation and without the need for electronically controlled indexing. Such a conversion system is shown diagrammatically in FIG. 7.

Figure 7:
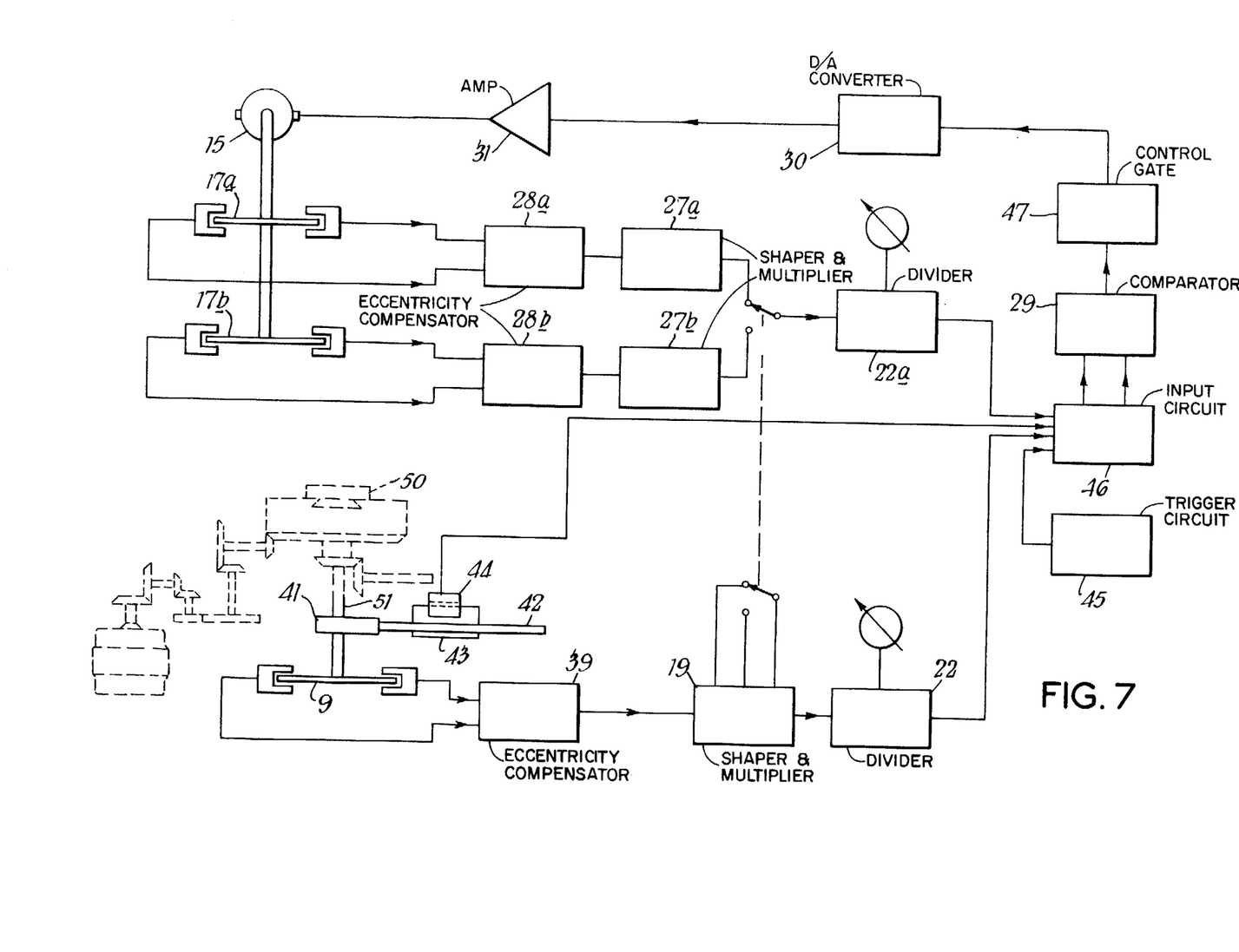
FIG. 7 illustrates a form of the invention designed as a conversion system for an existing, mechanically controlled, machine tool.

The dotted part of FIG. 7 represents the existing motor and gear driving system for oscillating the tool support drum by means of a generating cam 50 rotated continuously and uniformly during machining, a shaft 51 rotating with the cam.

The remainder constitutes a simplified form of the system shown in FIG. 3 with the provision of two gratings 17a and 17b of 72,000 and 36,000 lines respectively replacing the grating 17. By selection of these gratings, conditions most suitable for the gear to be ground can be selected, e.g., for a larger diameter slowly driven gear or for a small diameter quickly driven gear. Also an additional, adjustable, divider 22a is provided in the pulse channel from gratings 17a and 17b.

The pulses from the dividers, and from an inching circuit 45 (e.g., a one-shot trigger circuit) and the signal from reading head 44 are supplied to the reversible counter 29 by an input circuit 46 which diverts the received signals to the appropriate inputs of the counter 29. Inching circuit 45 enables an operator to introduce pulses one at a time during initial setting up of the machine.

A control gate 47 between the counter 29 and the converter 30 allows only small errors, below the value of three decades of the converter, to be converted. Larger errors produce a constant, relatively large, slew signal at the output of the converter.

It will also be seen that in this case the grating member 9 and the cam 41 are mounted on the shaft 51 and so rotate continuously and do not oscillate with the drum. Thus, motor 15 also rotates continuously and the system operates without indexing in the manner of the standard Gleason machine. In this case, it must also be noted that, in view of the retention of the generating cam 50, the control is such that, as with an unmodified Gleason machine, the angular velocity of the pitch line at the centre of the tooth face is not maintained precisely equal to the angular velocity of the arc 7 on the active side of the grinding wheel.

In the above examples, the main principles of operation for the drive of a spiral bevel gear grinding machine have been described. With minor modifications that will be apparent to engineers skilled in the technology of bevel gear production, the system can be used for cutting or roughing bevel gears. In the diagram a spiral bevel pinion has been used as the example. The system is equally applicable to crown wheels.

We claim:

1. A machine tool comprising a workpiece support which can be displaced about a first axis, a tool support which can be oscillated about a second axis and which is constructed to support an annular tool for rotation about a third axis spaced from the second axis so that a supported tool will not only rotate about its own axis but will also oscillate on an arcuate path about the second axis, and a control system comprising: two signal generating means for coupling to respective ones of said workpiece support and said tool support of the machine to produce signals indicative of the angular movements of the respective supports; a comparator for comparing the signals and issuing an error signal if the comparision indicates that said signals do not have a predetermined correspondence; and processing means interposed between the comparator and at least one of said generating means to modify the signal of the at least one generating means so that said signals will have said correspondence at said comparator when said supports are moving a desired relative manner.

2. A machine tool according to claim 1, wherein the signal generating means are pulse generating means coupled to the supports so that the control system produces oscillation of both supports about the first and second axes respectively, the comparator is a pulse comparator, and the control system further comprising means for temporarily bringing the tool support to rest after a number of cycles of oscillation of the tool support, and electrical indexing means operable when the tool support is staionary between oscillations, to introduce into the control system pulses equivalent to a predetermined angular movement of the workpiece support to cause indexing of the workpiece support by the amount of said angular movement.

3.. A machine tool as claimed in claim 1, wherein there are electrical indexing means for introducing into the control system when the tool support is stationary a signal equivalent to a predetermined angular movement of the workpiece support to index the workpiece support.

4. A machine tool as claimed in claim 2, wherein the indexing means comprises means for supplying additional pulses to the pulse comparator.

5. A machine tool as claimed in claim 1 and having means for modifying the operation of the control system in dependence upon the movement of one of the supports to achieve a workpiece profile defined by the modifying means.

6. A machine tool as claimed in claim 2 and having means for modifying the operation of the servo system in dependence upon the movement of one of the supports to achieve a workpiece profile defined by the modifying means, and wherein the modifying means is operable to supply additional pulses to the comparator.

7. A machine tool as claimed in claim 6, wherein the modifying means comprises cam means coupled to the workpiece support and pulse generating means coupled to the cam means to supply pulses in dependence upon the profile of the cam means.

8. A machine tool comprising a workpiece support which can be displaced about a first axis, a tool support which can be oscillated about a second axis and which is constructed to support an annular tool for rotation about a third axis spaced from the second axis so that a supported tool will not only rotate about its own axis but will also oscillate on an arcuate path about the second axis, and a control system comprising: two signal generating means coupled to respective ones of said workpiece support and said tool support of the machine to produce signals indicative of the angular movements of the respective supports; a comparator for comparing the signals and issuing an error signal if the comparison indicates that said signals do not have a predetermined correspondence; processing means interposed between the comparator and at least one of said generating means to modify the signal of the at least one generating means so that said signals will have said correspondence at said comparator when said supports are moving in a desired relative manner; and means for modifying the data compared by the comparator during the machining of a tooth of a workpiece to provide at least one of tip and root relief of the tooth.

9. A machine tool as claimed in claim 8, wherein said modifying means are operable to act to vary at least one of the signals supplied to the comparator as a function of the movement of one of the supports of the machine tool.

10. A machine tool as claimed in claim 9, wherein the signal generating means are pulse generating means and the comparator is a pulse comparator.

11. A machine tool as claimed in claim 10, wherein the modifying means are operable to supply additional pulses to the comparator.

12. A machine tool as claimed in claim 9, wherein the modifying means comprises means coupled to the processing means to modify the signal supplied by that processing means to the comparator in dependence upon the movement of one of the supports.

13. A machine tool as claimed in claim 12, wherein said means coupled to the processing means are responsive to one of said signals indicative of the angular movements of the supports.

14. A machine tool as claimed in claim 8, wherein the modifying means comprises cam means coupled to the tool support and third signal generating means for producing, in response to rotation of the cam means, a signal for modifying the action of the control system to provide at least one of tip and root relief of a tooth of a workpiece in dependence upon the form of the cam means.

15. A machine tool as claimed in claim 14, wherein the cam means are a cam and cam follower, and the third signal generating means comprises first means providing a pattern and second means to scan the pattern, the first and second means being arranged to be driven into relative motion by the movement of the cam follower.

16. A machine tool as claimed in claim 14, wherein the third signal generating means has its output connected to supply its output signal together with one of said signals indicative of angular position to the comparator.

17. A machine tool as claimed in claim 11, wherein the modifying means also comprises a cam means coupled to the tool support and third pulse generating means for producing, in response to rotation of the cam means, a pulse signal for modifying the action of the control system to provide at least one of tip and root relief of a tooth of a workpiece independence upon the form of the cam means.

18. A machine tool as claimed in claim 8, wherein the modifying means comprises said generating means for coupling to the tool support, that generating means comprising an arcuate portion for rotation with the tool support and scanning means for scanning a region of that portion, the arcuate portion being adjustable so that its centre of radius can be spaced from its axis of rotation to achieve at least one of tip and root relief of a tooth of a workpiece.

19. A machine tool as claimed in claim 12, wherein the modifying means additionally comprises said generating means coupled to the tool support, that generating means comprising an arcuate portion for rotation with the tool support and scanning means for scanning a region of that portion, the arcuate portion being adjustable so that its centre of radius can be spaced from its axis of rotation to achieve at least one of tip and root relief of a tooth of a workpiece.

* * * * *